United States Patent [19]

Stanton, Jr. et al.

[11] 4,207,275
[45] Jun. 10, 1980

[54] MIXING APPARATUS

[75] Inventors: James L. Stanton, Jr., Rochester; William H. Kipple, Spencerport, both of N.Y.

[73] Assignee: General Signal Corporation, Stamford, Conn.

[21] Appl. No.: 758,900

[22] Filed: Jan. 13, 1977

Related U.S. Application Data

[63] Continuation of Ser. No. 631,287, Nov. 12, 1975, abandoned, which is a continuation of Ser. No. 456,107, Mar. 29, 1974, abandoned.

[51] Int. Cl.² ............................................. C02C 5/04
[52] U.S. Cl. ........................................ 261/93; 261/87; 210/221 P
[58] Field of Search .................... 261/87, 93; 209/169; 210/220, 221 R, 221 P

[56] References Cited

U.S. PATENT DOCUMENTS

| | | | |
|---|---|---|---|
| 2,243,301 | 5/1941 | Weinig | 261/93 |
| 2,433,592 | 12/1947 | Booth | 261/93 |
| 3,227,701 | 1/1966 | Pennington | 261/93 |
| 3,536,305 | 10/1970 | Lefrancois | 261/93 |
| 3,574,331 | 4/1971 | Kurosawa et al. | 261/93 |
| 3,792,840 | 2/1974 | Sisk et al. | 261/93 |

Primary Examiner—Frank W. Lutter
Assistant Examiner—Gregory N. Clements
Attorney, Agent, or Firm—Jeffrey S. Mednick

[57] ABSTRACT

An apparatus for mixing a liquid and a gas in a tank includes a means for circulating the liquid in the tank and a sparge ring for dispersing gas into the tank. The circulating means includes a plurality of blades extending downwardly from a bottom surface of a disc so that rotation of the blades creates a suction area. The sparge ring introduces gas into the tank in a direction that bypasses the suction area to prevent the gas from flowing into the suction area. Preferably, the sparge ring has a discharge means with a radius that is larger than the distance from the center of the disc to the outer tips of the blades.

8 Claims, 4 Drawing Figures

MIXING APPARATUS

This is a continuation of application Ser. No. 631,287, filed Nov. 12, 1975, now abandoned, which is a continuation of application Ser. No. 456,107, filed Mar. 29, 1974, and now abandoned.

BACKGROUND OF THE INVENTION

1. Field of use

While the invention is subject to a wide range of applications, it is especially suited for use in a system for mixing oxygen with industrial waste and will be particularly described in that connection.

2. Description of the Prior Art

Mixing apparatuses biochemically treat BOD-containing waste water, such as municipal sewage, by oxygenation. This has customarily been accomplished by providing a sparge ring in a tank beneath an impeller. The impeller circulates the sewage and the sparge ring introduces the oxygen into the tank to be mixed. For example, see U.S. Pat. No. 3,227,701 to Pennington and U.S. Pat. No. 3,547,813, to Robinson, et al.

In one known biochemical oxidation process, sewage is mixed with oxygen-containing gas, such as air, and activated sludge. The latter consists essentially of aerobic organisms which have the ability in the presence of sufficient dissolved oxygen to absorb and assimilate the biochemically oxidizable organic material of the municipal sewage, thereby converting the organic material to forms which can be separated readily from the purified water. Under normal conditions the bacteria multiply rapidly in the aeration tanks during this treatment step. When the requisite period of BOD conversion is complete, the mixed liquor is settled, the purified affluent decanted to receiving waters, and sludge is withdrawn from the bottom of a clarifier.

As pointed out above, it is known to use a sparge ring to supply oxygen-containing gas to the waste water. The sparge ring would be placed beneath a circulating impeller with the gas traveling to the suction side of the impeller. The impeller generally rotates at a fixed speed. When the sparge ring is supplying gas to the tank, the impeller is drawing a gassed power. When the sparge ring is not supplying gas to the tank, the impeller is drawing an ungassed power. The ratio of ungassed power to gassed power is known as the K Factor. Generally, the K Factor is quite low since the system draws more power when ungassed. This is because it requires more torque to rotate the impeller through liquid than through liquid and gas. Therefore, if a motor for the impeller is designed to operate at a given gassed power, and someone accidentally turns off the gas, the power drawn increases and the motor may be damaged.

It is an object of the present invention to provide an apparatus for mixing a liquid with a gas.

It is a further object of the present invention to provide a mixing apparatus than can operate in a gassed or ungassed condition without concern for overloading the motor that drives the impeller.

It is a further object of the present invention to provide an apparatus for mixing a liquid with a gas at a higher power level to increase the mass transfer rate.

It is a further object of the present invention to provide an apparatus for mixing a gas with a liquid being circulated by a radial flow turbine.

SUMMARY OF THE INVENTION

In accordance with the present invention, an apparatus mixes a liquid with a gas in a vessel such as a tank. Means, such as a submerged impeller driven by a motor, circulates the liquid in the tank. A sparge ring introduces the gas into the tank. The sparge ring is beneath the impeller and includes a supply means, such as a plurality of holes spaced about the top surface of the sparge ring. The supply means are located to prevent the gas from entering the suction side of the impeller and insure a good mass transfer rate.

For a better understanding of the present invention, together with other and further objects thereof, reference is made to the following description, taken in connection with the accompanying drawings, while its scope will be pointed out in the appended claims.

DESCRIPTION OF THE PREFERRED EMBODIMENT

Figure 1:
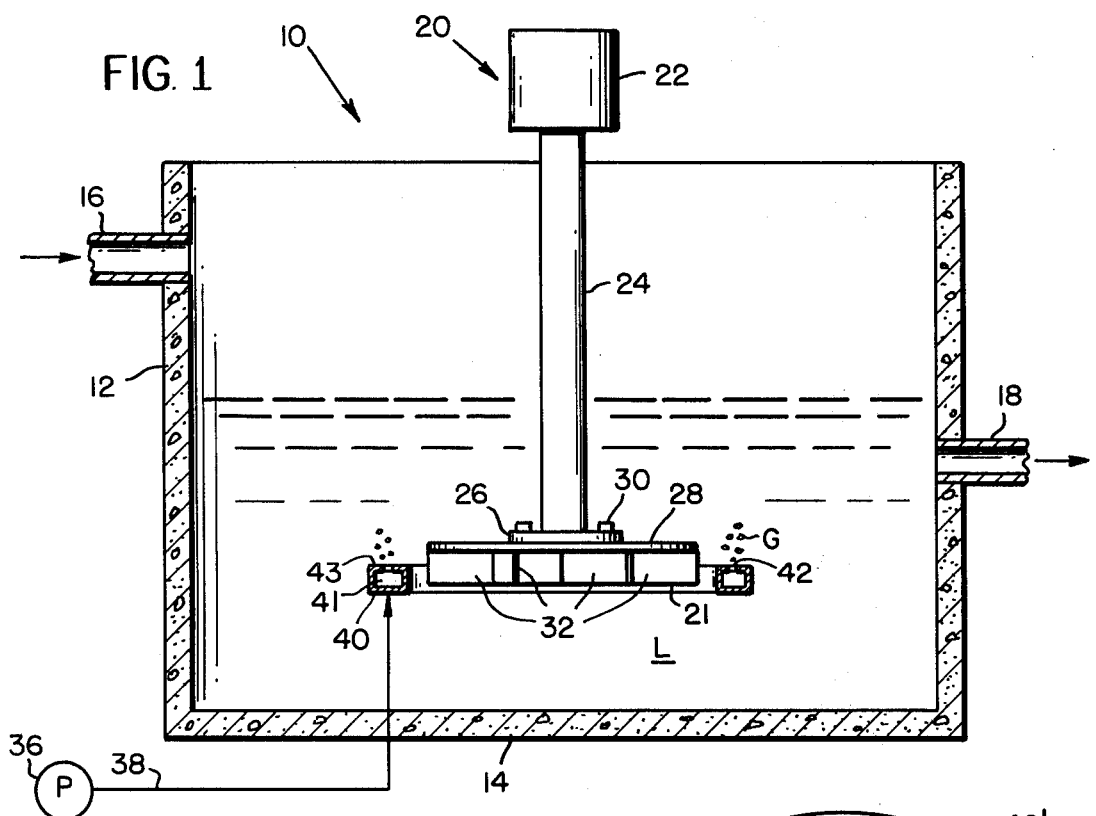
FIG. 1 is a diagrammatic, cross-sectional view of the mixing apparatus of the present invention.

In accordance with the present invention, an apparatus mixes a liquid L with a gas G. The apparatus includes a tank 10 with the liquid L therein. A means 20 circulates the Liquid L in the tank 10. A sparge ring 40 introduces gas G into the tank 10. Sparge ring 40 introduces the gas away from a suction area 21 of the circulating apparatus 20 so that the circulating apparatus 20 encounters only liquid resistance.

Referring to FIG. 1, there is shown a cross-sectional view of an apparatus in accordance with the present invention. The apparatus includes the tank 10 having side walls 12, end walls (not shown) and a base 14. The tank is generally constructed of concrete. Inlet conduit 16 supplies the liquid L, such a municipal or industrial waste, to tank 10. Outlet conduit 18 is provided for supplying liquid L to an additional apparatus, such as a clarifier, after the liquid has been oxygenated.

Figure 2:
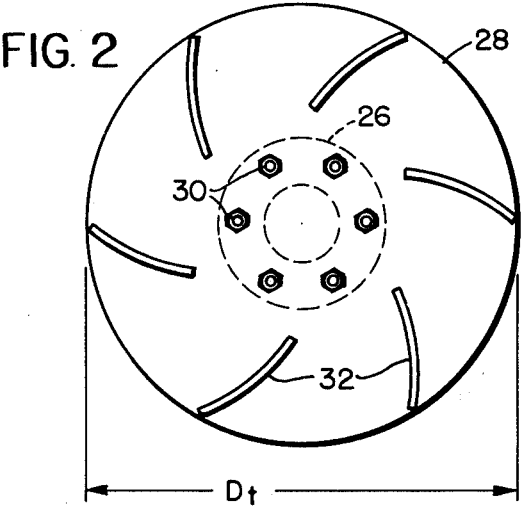
FIG. 2 is a bottom view of an impeller used in the present invention.

Circulating apparatus 20 may be any suitable submerged impeller-type mixer, preferably one having curved blades, such as Model No. 89Q125 sold by the Mixing Equipment Company, Rochester, New York. It includes a motor 22, such as, for example, a 125 horsepower, induction motor, for rotating a drive shaft 24. On the bottom end of drive shaft 24 is a collar 26, which is mounted to a disc 28 by several bolts, two of which are shown at 30 in FIG. 4. Impeller or turbine blades 32 are rigidly connected to disc 28 by any suitable means such as bolts or welds (not shown). As blades 32 rotate, they create a suction area beneath themselves. FIG. 2 is a bottom view of the disc 28 with impeller or turbine blades 32 mounted thereon. Shaft 24, disc 28, and blades 32 may be made of any suitable material, such as stainless or galvanized steel. Blades 32 are oriented on disc 28 so that the liquid L is circulated substantially radially as it leaves impeller blades 32. While circulating apparatus 20 has been illustrated as being top-entering, a bottom-entering apparatus may also be used. Also, stabilizing rings or devices to limit radial shaft motion have not been illustrated but they may be used.

Referring again to FIG. 1, gas G is supplied to tank 10 via sparge ring 40 that is fastened to tank 10 by any suitable means, such as brackets (not shown) attached to base 14. The gas is pumped to sparge ring 40 through a gas supply line 38 by a suitable pump means 36. As shown diagrammatically in FIG. 1, the gas enters an annular hollow portion 41 of sparge ring 40 from gas supply line 38 and leaves sparge ring 40 through a set of apertures 42 extending about the top surface 43 of sparge ring 40.

It has been customary to place a sparge ring beneath the impeller blades so that the gas from the sparge ring is delivered to the suction area of the blades. This reduces the density of the medium being circulated by the blades. The medium, being of lower density, offers less resistance to blade rotation. Since the power drawn by the motor rotating the impeller is directly proportional to the resistance offered by the medium, the motor draws less power when gas is delivered to the suction area of the blades. This might seem desirable except that the mass transfer rate decreases as the power drawn by the motor decreases.

Figure 4:
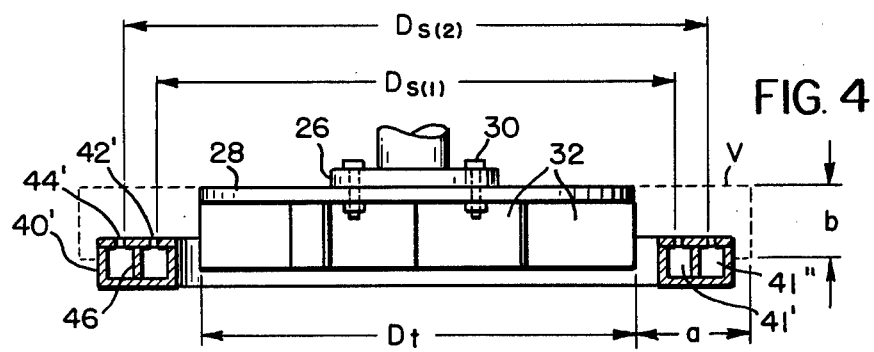
FIG. 4 is a cross-sectional view illustrating the relationship of the sparge ring and the impeller in the present invention.

In accordance with the present invention, the sparge ring introduces gas into the tank in a direction that bypasses the suction area of the blades so that the blades encounter only liquid resistance. This is accomplished by locating the sparge ring so that it discharges gas within a volume V (shown as dashed lines in FIG. 4). Volume V comprises a ring having a radial dimension a and an axial dimension b. Radial dimension a extends from 1 to 1.5 time the diameter $D_t$ of the blades. Axial dimension b extends downward from the disc 28 a distance approximately equal to the height of blades 32. As long as gas is introduced within volume V, the gas will not enter the suction area of the blades. FIG. 4 illustrates this relationship for sparge ring 40', but it should be understood that the principal is applicable to other sparge rings, such as sparge ring 40 in FIG. 1. Preferably, the diameter $D_s$ of the sparge ring at the apertures is approximately 1.2 times the diameter $D_t$ of the turbine blades so that the gas is introduces at this location.

As used in this disclosure, the diameter $D_s$ is taken at an imaginary circle that is formed by the radially innermost point of each aperture in a set of apertures such as imaginary circle C for apertures 42'. The diameter $D_t$ referred to herein as the diameter of the blades, is actually the diameter of a circle formed by the outer tips of the rotating blades. By positioning the apertures radially outward of the turbine blades, the turbine blades, as they rotate, encounter only liquid resistance. This draws more power and therefore increases the mass transfer rate. If gas is introduced radially outwardly of volume V, the mass transfer rate decreases significantly.

If gas is introduced above the volume V, the mass transfer rate will decrease. If gas is introduced below the volume V, gas may drift into the suction area of the blades and reduce the power drawn. Preferably, the gas is introduced at approximately the midpoint of the blade (axially) for best mass transfer.

Figure 3:
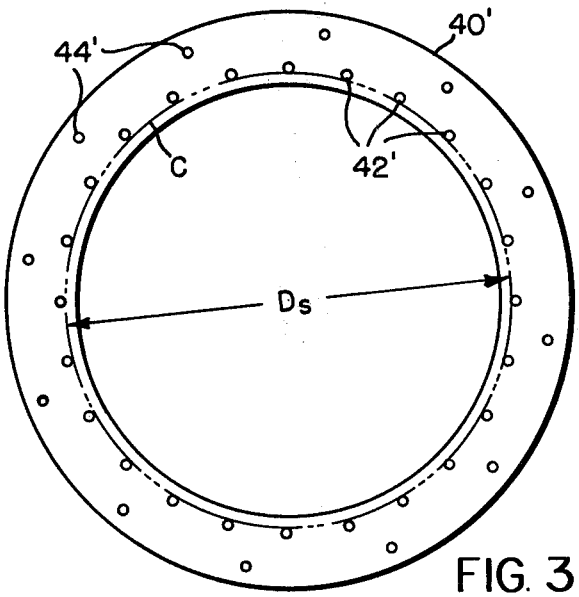
FIG. 3 is a top view of a sparge ring used in the present invention.

Referring to FIG. 3, there is shown a top view of a modified sparge ring 40', also made in accordance with the present invention. The sparge ring 40' differs from sparge ring 40 in that it contains two sets of apertures. A first set of apertures 42' is spaced about top surface 43' of sparge ring 40'. A second set of apertures 44' is also spaced about top surface 43'. The second set is radially outward of the first set. As shown, each set of apertures lies along a circle in the top surface of the sparge ring, but this is a matter of convenience as long as the gas is directed away from the suction area of impeller blades 32.

Referring to FIG. 4, the use of two sets of apertures will become more clear. Sparge ring 40' includes an annular divider 46 for separating the interior of the sparge ring into two distinct hollow portions 41' and 41''. Gas may be introduced into either (or both) hollow portion. If the interior hollow portion 41' is used, gas is delivered to the tank through apertures 42'. If the outside hollow portion 41'' is used, gas is delivered to the tank through apertures 44'. Therefore, the diameter $D_s$ may be changed from $D_{s(1)}$ to $D_{s(2)}$, depending on which of hollow portions 41' or 42'' are supplied with gas from line 38.

It should be noted that an annular slot (or slots) may be used in place of a set of apertures. Further, while it is convenient to make the sparge ring rectangular in cross-section, any cross-sectional shape may be used. It is also possible to use a divided sparge ring, such as the one shown in FIGS. 3 and 4, to mix more than one gas with a liquid.

EXAMPLE

A rectangular tank approximately 38 feet by 40 feet by 30 feet in depth contained approximately 20 feet of water. A 125 horsepower induction motor rotated a steel disc at less than 100 revolutions per minute. Each blade had a radius of curvature of approximately 38 inches and each blade was approximately 35 degrees from a radial line from the outer edge of the blade. Gas was supplied at a flow rate of approximately 3,000 standard cubic feet per minute through a sparge ring having a diameter $D_s$ of approximately 7 feet. This diameter $D_s$ comprised 24 aperatures each approximately $\frac{3}{4}$ inches in diameter with a pressure drop of about 1.5 pounds per square inch across the aperture. The top surface of the sparge ring was approximately 6 inches below the disc. The gassed horsepower drawn was approximately 93$\frac{1}{2}$, and the ungassed horsepower was approximately 91$\frac{1}{2}$, for a K Factor of approximately 1.02.

One skilled in the art will realize that there has been disclosed a mixing apparatus including a sparge ring that provides a high K Factor and a high mass transfer rate.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In an apparatus for mixing a liquid with a gas including a tank with said liquid therein, a circulating means for creating a radial flow of said liquid to circulate said liquid in said tank, said circulating means comprising a rotatable shaft, a disc mounted on said shaft, and a plurality of blades extending downwardly from a bottom surface of said disc so that rotation of said plurality of blades creates a suction area, said suction area being the only suction area created by said circulating means, the improvement including:

sparge ring means having a discharge means with a radius that is larger than the distance from the center of said disc to outer tip of said blades, said discharge means being axially positioned so as to introduce said gas into a zone extending axially downward from said disc a distance approximately equal to the height of said blades for introducing gas into said tank in a direction that bypasses said suction area to prevent gas from flowing into said suction area.

2. The apparatus as defined in claim 1, wherein said sparge ring means is hollow in cross-section with a plurality of apertures in its top surface communicating with the hollow portion and functioning as said discharge means.

3. The apparatus as defined in claim 2, wherein the diameter of the sparge ring means at said apertures is between 1 and 1.5 times the diameter of the blades.

4. The apparatus as defined in claim 3, wherein said sparge ring means introduces said gas at the approximate axial midpoint of said blades.

5. In an apparatus for mixing a liquid with a gas including a tank with said liquid therein, a circulating means for creating a radial flow of said liquid to circulate said liquid in said tank, said circulating means comprising a rotatable shaft, a disc mounted on said shaft, and a plurality of blades extending downwardly from a bottom surface of said disc so that rotation of said plurality of blades creates a suction area, said suction area being the only suction area created by said circulating means, the improvement comprising:

sparge ring means for introducing gas into said tank in a direction that bypasses said suction area to prevent gas from flowing into said suction area, said sparge ring means including discharge means being axially positioned so as to introduce said gas into a zone extending axially downward from said disc a distance approximately equal to the height of said blades.

6. The apparatus as defined in claim 5, wherein said sparge ring means is hollow in cross-section with a plurality of apertures in its top surface communicating with the hollow portion and functioning as said discharge means.

7. The apparatus as defined in claim 6, wherein the diameter of the sparge ring means at said apertures is between 1 and 1.5 times the diameter of the blades.

8. The apparatus as defined in claim 7, wherein said sparge ring means introduces said gas at the approximate axial midpoint of said blades.

* * * * *